(12) United States Patent
Hays

(10) Patent No.: US 7,987,548 B1
(45) Date of Patent: Aug. 2, 2011

(54) LEAF AND LAWN VACUUM BAGGER

(76) Inventor: John N. Hays, Houston, TX (US)

( * ) Notice: Subject to any disclaimer, the term of this patent is extended or adjusted under 35 U.S.C. 154(b) by 1175 days.

(21) Appl. No.: 11/715,237

(22) Filed: Mar. 6, 2007

Related U.S. Application Data

(60) Provisional application No. 60/778,863, filed on Mar. 6, 2006.

(51) Int. Cl.
*A47L 5/00* (2006.01)
(52) U.S. Cl. .......... 15/327.5; 15/352; 15/353; 15/246.2; 15/DIG. 8; 55/374; 55/376; 55/DIG. 2; 55/DIG. 3
(58) Field of Classification Search .................. 15/347, 15/352, 353, 246.2, 327.5, DIG. 8; 55/374, 55/376, DIG. 2, DIG. 3; *A47L 5/00*
See application file for complete search history.

(56) References Cited

U.S. PATENT DOCUMENTS

| 4,713,858 | A |  | 12/1987 | Kelber |
|---|---|---|---|---|
| 4,715,872 | A | * | 12/1987 | Snyder ............................ 55/315 |
| 4,870,714 | A |  | 10/1989 | Miner |
| 6,170,118 | B1 | * | 1/2001 | McIntyre et al. ............ 15/327.6 |
| 6,574,829 | B1 |  | 6/2003 | Marcum et al. |
| 6,988,293 | B2 |  | 1/2006 | Ritter |
| 2006/0254021 | A1 |  | 11/2006 | McRedmond |

* cited by examiner

*Primary Examiner* — David A Redding
(74) *Attorney, Agent, or Firm* — Kenneth A. Roddy

(57) ABSTRACT

A leaf and lawn vacuum bagger has a housing that is attached to the exhaust outlet of a conventional leaf and lawn blower/vacuum or mulching device, and a conventional disposable trash bag is releasably attached to the housing for capturing the vacuumed yard debris. When the disposable bag is full or otherwise, it may be easily detached and another disposable bag easily affixed to collect more vacuumed leaf and yard debris. Alternatively, the vacuumed leaf and lawn debris can be collected and retained in the housing for later removal.

5 Claims, 4 Drawing Sheets

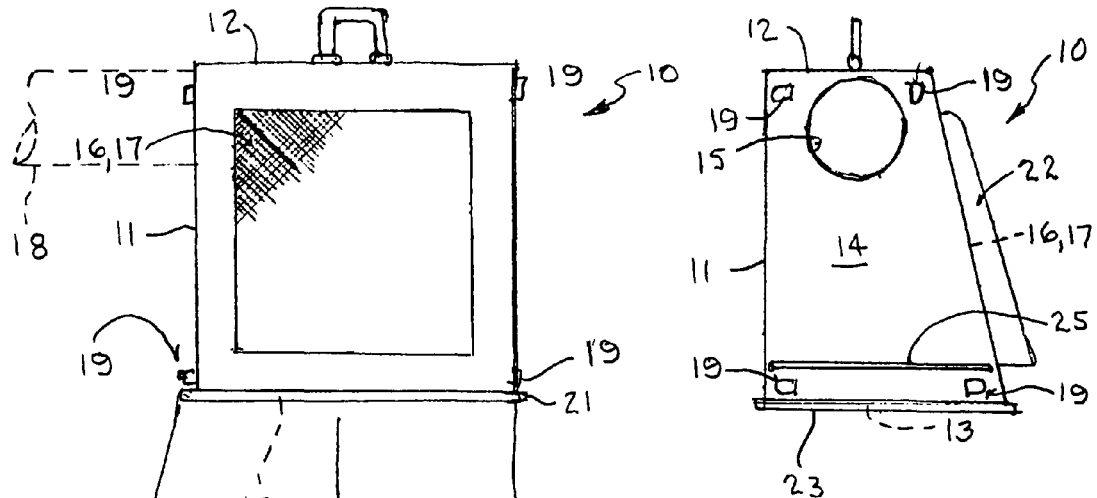
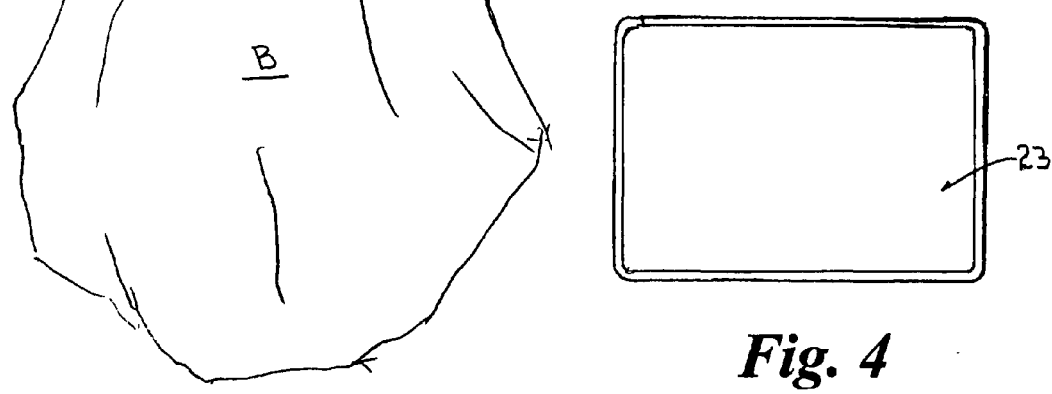
Fig. 2
Fig. 3
Fig. 4
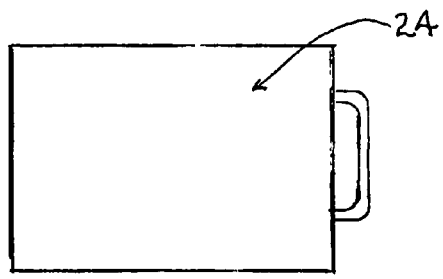
Fig. 5

LEAF AND LAWN VACUUM BAGGER

CROSS REFERENCE TO RELATED APPLICATION

This application claims priority of U.S. Provisional Patent Application Ser. No. 60/778,863 Filed Mar. 6, 2006.

BACKGROUND OF THE INVENTION

1. Field of the Invention

This invention relates generally to lawn blower/vacuums and mulchers, and more particularly to a collecting and bagging apparatus for leaves and lawn debris, to be used in conjunction with a conventional lawn blower/vacuum or mulcher and utilizes conventional disposable trash bags.

2. Background Art

Some models of conventional leaf and lawn blower/vacuum and mulching devices provide a collection bag that is attached to the exhaust tube or discharge tube of the device to capture the vacuumed yard debris and are adapted to hang from the user's shoulder. Other models of conventional leaf and lawn blower/vacuum and mulching devices have an exhaust or discharge outlet which is integral with the housing and provide a collection bag that is attached to the device housing or the exhaust or discharge outlet of the housing to capture the vacuumed yard debris. Most conventional collection bags are bulky and awkward to handle. Typically, the conventional collection bag is formed of heavy air permeable material so that the exhaust air passes through the sidewall of the bag to the atmosphere and the vacuumed debris and/or mulched material is entrained inside the bag; and the bag is provided with a zipper for opening the bag to empty the contents.

One of the problems with the conventional air permeable collection bags is that the exhaust air circulates through the bag contents and the air that passes through the sidewall the atmosphere can contain airborne dust particles and other small particles, and can be inhaled by the user. Even if the user wears a dust mask and goggles, they will be covered with dust from the collection bag. Another problem with the conventional air permeable collection bag is that it requires frequent cleaning because the pores of the bag become clogged by the airborne dust particles and other small particles circulated inside the bag.

Still another problem with the conventional air permeable collection bags is that the contents of the bag has to be transferred by hand to larger containers or plastic bags in several steps which is time consuming and difficult to accomplish cleanly and easily. Typically, in this process the user will place a conventional plastic trash bag or trash can liner inside of a garbage can, detach the air permeable collection bag, carry it to the lined garbage can, unzip the collection bag, dump and or/scrape the contents into the lined garbage can, seal the plastic trash bag or trash can liner, lift the trash bag or liner from the garbage can, and then insert another plastic trash bag or trash can liner inside of the garbage and start the process all over again as the collection bag gets full. Again, the user is exposed to airborne dust particles and other small particles during the steps of detaching the air permeable collection bag, carrying it to the lined garbage can, unzipping the collection bag, and dumping and or/scraping the contents into the lined garbage can.

Ritter, U.S. Pat. No. 6,988,293 discloses a collection system for lawn blower/vacuums, which includes a port coupling fitted to the exhaust port of a blower/vacuum, a dust cover, and a specially designed disposable biodegradable plastic collection bag. Both sides of the collection bag has several rows of T-shaped slits and two rows of straight or I-shaped slits that allow air to escape from the bag but retain the leaves and lawn debris deposited therein. The collection bag is shaped to fit inside the dust cover that is fixed to the port coupling. The dust cover envelops the collection bag and shields the operator from the dust that passes through the collection bag.

Marcum et al, U.S. Pat. No. 6,574,829 discloses a leaf receptacle lid having a porous conduit that is removably connected to the hose outlet of a blower/vacuum and contains a vertical chute and an overhanging horizontal lip. The chute is adapted to hold a flexible leaf receptacle and the overhanging lip is adapted to rest upon a support. The lid also contains a hinged door having an opening connected to the frame.

Miner, U.S. Pat. No. 4,870,714 discloses a blower/vacuum system, wherein the debris is passed through a fan housing to an outlet and to a dual-porosity collection bag having front, top, bottom, and side portions fabricated from a fabric having a first air flow porosity and a rear portion fabricated from an another fabric having a second air flow porosity that is higher than the first air flow porosity so that the entire fabric surface will function to exhaust the air flow with the major portion of the air flow flowing through the rear portion to direct the exhaust air and any dust and other particles away from the user.

Kelber, U.S. Pat. No. 4,713,858 discloses a leaf collection apparatus having a long flexible and extendable tube detachably secured at one end to a blower/vacuum and secured at the other end to a shroud or skirt. The shroud or skirt fits over and attaches to the top of a large centrally located container, such as a trash can, with a quick-release fastening mechanism.

The present invention overcomes the aforementioned problems and is distinguished over the prior art in general, and these patents in particular, by a leaf and lawn vacuum bagger having a housing which is removably attached to the exhaust outlet of a conventional leaf and lawn blower/vacuum or mulching device, and a conventional disposable trash bag is releasably attached to the housing, which captures the vacuumed yard debris. When the bag is full or otherwise, it may be easily detached and sealed and another bag easily affixed to collect more vacuumed leaf and yard debris. Alternatively, the vacuumed leaf and lawn debris can be collected and retained in the housing for later removal.

In a second embodiment, the housing has an open top end with a flexible sleeve removably attached to the bottom end of an air permeable bag by a zipper attachment and the air permeable bag is connected to the exhaust outlet of a conventional leaf and lawn blower/vacuum or mulching device, and a conventional disposable trash bag is releasably attached to the bottom end of the housing, to capture the vacuumed yard debris.

SUMMARY OF THE INVENTION

It is therefore an object of the present invention to provide a leaf and lawn vacuum bagger apparatus can be easily and quickly attached to a conventional leaf and lawn blower/vacuum or mulcher that allows quick and easy attachment of a bag, disposable or otherwise, to capture vacuumed yard debris accumulated or passed from the exhaust of the blower/vacuum or mulching device.

It is another object of this invention to provide a leaf and lawn vacuum bagger apparatus that is attached to a conventional leaf and lawn blower vacuum or mulcher and simultaneously collects and bags leaf and lawn vacuum debris during operation of the leaf and lawn blower/vacuum or mulcher device.

Another object of this invention is to provide a leaf and lawn vacuum bagger apparatus that allows a user to bag yard debris from leaf and lawn blower/vacuums or mulchers in a disposable or detachable bag, securely close or seal the full bag, and detach or dispose of the closed or sealed bag, without exposure to airborne dust and debris normally associated with collection and disposal of vacuumed yard debris.

Another object of this invention is to provide a leaf and lawn vacuum bagger apparatus that can be easily and quickly attached to a zippered air permeable bag and allows quick and easy attachment of a conventional disposable trash bag to capture vacuumed yard debris accumulated or passed from the exhaust of a conventional blower/vacuum or mulching device.

A further object of this invention is to provide a leaf and lawn vacuum bagger apparatus that is attached to a conventional leaf and lawn blower/vacuum or mulcher and does not interfere with the normal handling or operation of the leaf and lawn blower/vacuum or mulcher device.

A still further object of this invention is to provide a leaf and lawn vacuum bagger apparatus that is simple in construction, inexpensive to manufacture, and rugged and reliable in operation.

Other objects of the invention will become apparent from time to time throughout the specification and claims as hereinafter related.

The above noted objects and other objects of the invention are accomplished by a leaf and lawn vacuum bagger having a housing which is removably attached to the exhaust outlet of a conventional leaf and lawn blower/vacuum or mulching device, and a conventional disposable trash bag is releasably attached to the housing, which captures the vacuumed yard debris. When the bag is full or otherwise, it may be easily detached and another bag easily affixed to collect more vacuumed leaf and yard debris. Alternatively, the vacuumed leaf and lawn debris can be collected and retained in the housing for later removal.

In a second embodiment, the housing has an open top end with a flexible sleeve removably attached to the bottom end of an air permeable bag by a zipper attachment and the air permeable bag is connected to the exhaust outlet of a conventional leaf and lawn blower/vacuum or mulching device, and a conventional disposable trash bag is releasably attached to the bottom end of the housing, to capture the vacuumed yard debris.

BRIEF DESCRIPTION OF THE DRAWINGS

FIG. 2 is a front elevation view of the leaf and lawn vacuum bagger with a disposable bag attached thereto.

FIG. 3 is a left side view elevation view of the leaf and lawn vacuum bagger having an optional exhaust deflector attachment, and showing a snap-on retaining cover or an alternative slide-in retaining plate.

FIG. 4 is a top plan view of the snap-on retaining cover for the leaf and lawn vacuum bagger.

FIG. 5 is a top plan view of the slide-in retaining plate for the leaf and lawn vacuum bagger.

DESCRIPTION OF THE PREFERRED EMBODIMENTS

Figure 1:
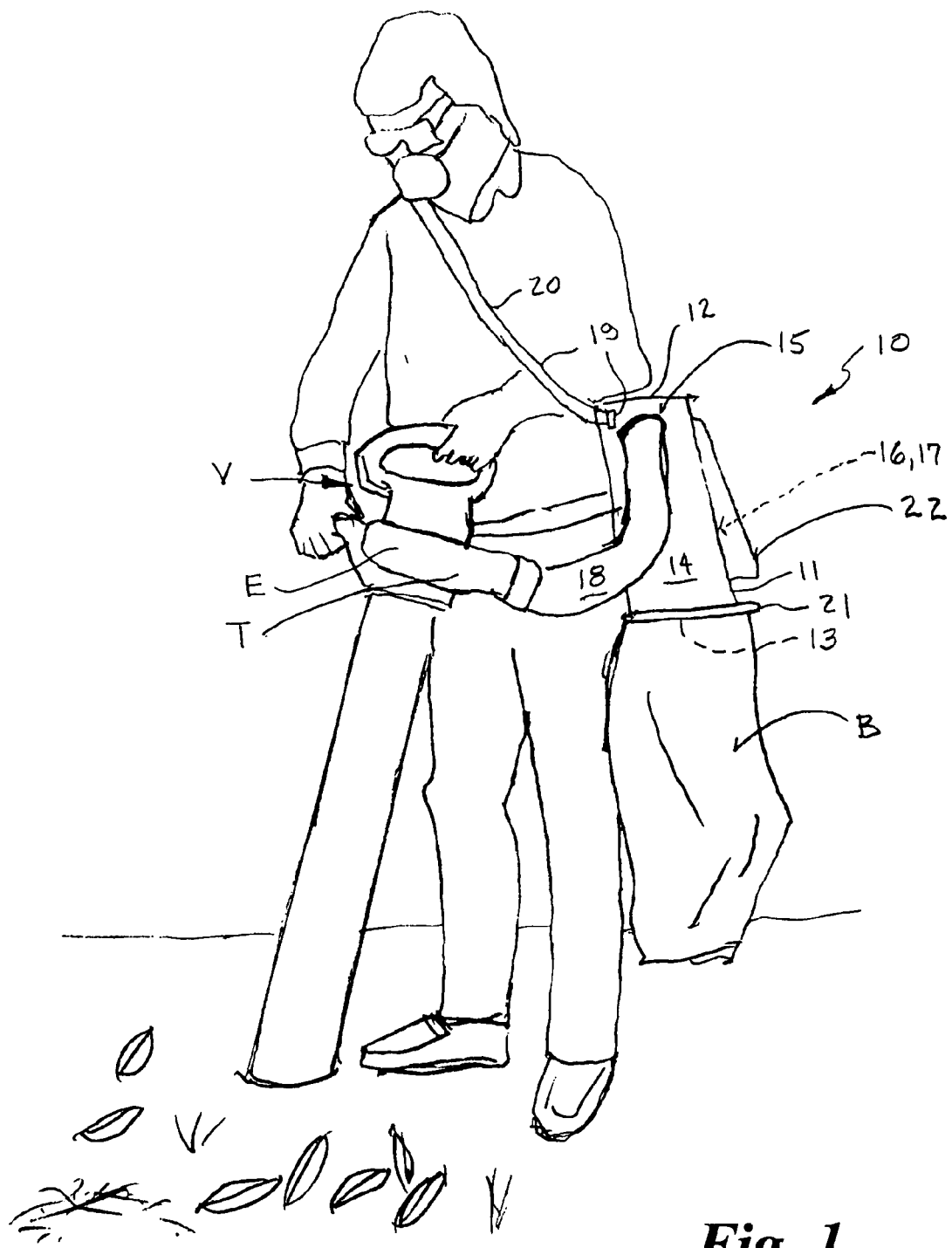
FIG. 1 is a pictorial illustration of a first embodiment the leaf and lawn vacuum bagger apparatus in accordance with the present invention attached to the exhaust outlet of a conventional leaf and lawn blower/vacuum, shown in operation.

Referring to the drawings by numerals of reference, there is shown in FIGS. 1, 2 and 3, a first preferred embodiment of the leaf and lawn vacuum bagger apparatus 10 in accordance with the present invention, attached to the exhaust outlet E of a leaf and lawn blower/vacuum or mulcher V. In the illustrated example, the blower/vacuum or mulching device V is of the type wherein the exhaust outlet E is in the form of a discharge or exhaust tube T, however, it should be understood that the conventional leaf and lawn blower/vacuum and mulching device V may be of the type having an exhaust or discharge outlet which is integral with the housing.

The bagger apparatus 10 has a hollow generally rectangular housing 11 formed of rigid material having a top end wall 12, an open bottom end 13, a side wall 14 having an inlet 15 which is adapted to be connected in fluid communication with the exhaust outlet E, and a front side 16 having an opening covered by an exhaust screen 17, which allows air to exit the housing. In the illustrated example, a hose 18 is adjoined at one end to the inlet 15 in fluid communication with the interior of the housing 11, and its opposite end is attached to the to the exhaust outlet E or exhaust or discharge tube T of the conventional leaf and lawn blower vacuum or mulcher device V.

Connections 19 are provided on the exterior of the housing 11 for connecting straps, harnesses, or shoulder straps 20 to support or suspend the bagger apparatus 10 on the user's body and allow multiple methods of carrying and using the bagger. The open top end of a conventional disposable plastic trash bag B is releasably attached to the lower end of the housing 11, by an elastic band or cord 21, or other suitable clamping means.

Alternatively, rather than utilizing a connecting hose 18, the inlet 15 in the side wall 14 of the bagger housing 11 may be connected directly to the exhaust outlet E or exhaust or discharge tube T, or the bagger housing 11 may be removably or permanently attached to the housing of the blower/vacuum or mulcher V. The inlet 15 may alternatively be provided in the top end wall 12, rather than the side wall 14, depending upon the type and location of the exhaust outlet E of the blower/vacuum or mulcher V. For example, the blower/vacuum or mulcher V may be of the type having an exhaust outlet at the bottom end of its housing, in which case the inlet in the top end wall 12 of the bagger housing 11 would be connected in fluid communication with the downwardly facing exhaust outlet. It should also be understood that the bagger housing 11 may be formed as an integral component of the housing of the blower/vacuum or mulcher V.

As shown in FIGS. 1 and 3, the bagger 10 may be provided with an optional exhaust deflector attachment 22, which releasably attaches over the exhaust screen 17 and can be positioned to direct the exhaust away from the housing 11 in selected directions if desired.

A flat snap-on retaining cover attachment 23, as shown in FIG. 4, may be provided for snap fitting onto the open bottom end of the bagger housing 11 to cover its open bottom end 13 as shown in FIG. 3. A flat slide-in retaining plate 24, as shown in FIG. 5, may also be provided, which slides laterally into an opening or slot 25 in the side wall 14 of the housing 11 (FIG. 3) above its open bottom end 13 to close the open bottom end.

Figure 6:
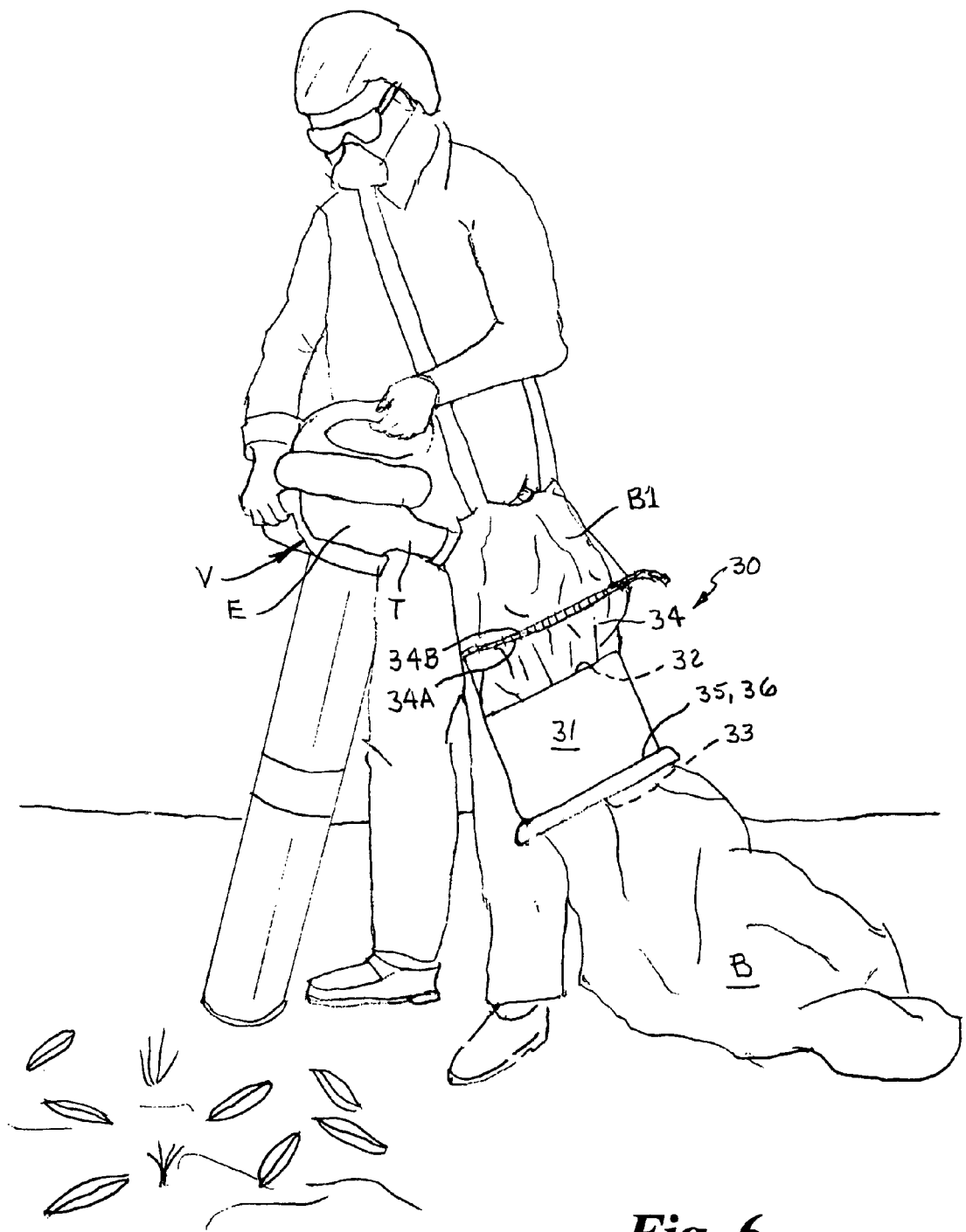
FIG. 6 is a pictorial illustration of a second embodiment of the leaf and lawn vacuum bagger apparatus in accordance with the present invention attached to the exhaust of a conventional leaf and lawn blower/vacuum, shown in operation.
Figure 7:
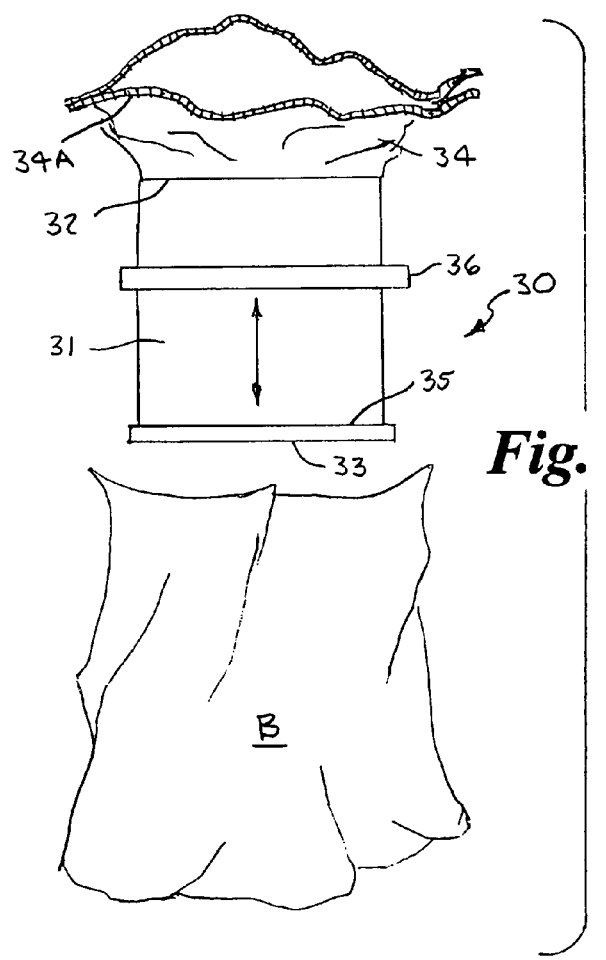
FIG. 7 is an exploded front elevation view of the second embodiment of the leaf and lawn vacuum bagger, shown with the bag retaining ring in an upper position and the disposable bag unattached to the housing.
Figure 8:
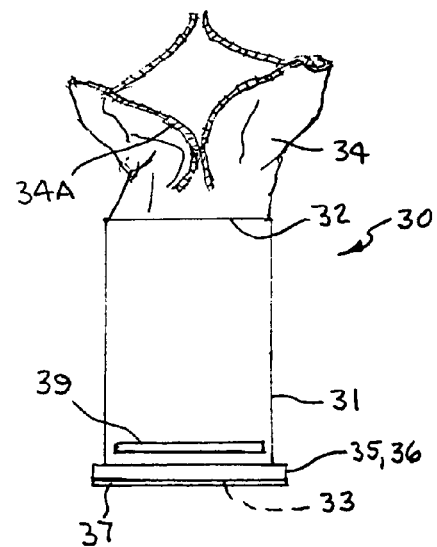
FIG. 8 is a left side elevation view of the housing of the second embodiment showing a snap-on retaining cover attached to its bottom end and a slot for an alternative slide-in retaining plate.
Figure 9:
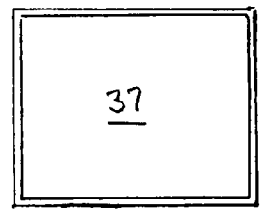
FIG. 9 is a top plan view of the snap-on retaining cover for the second embodiment.

Referring now to FIG. 6, a second preferred embodiment of the leaf and lawn vacuum bagger apparatus 30 is shown attached to the exhaust tube T of a conventional leaf and lawn blower/vacuum or mulcher V. Referring additionally to FIGS. 7, 8, and 9, in this embodiment, the apparatus 30 has a hollow generally rectangular housing 31 formed of rigid material having an open top end 32, an open bottom end 33, and a flexible sleeve 34 secured at a bottom end to the open top end of the housing in fluid communication with the interior of the housing. The sleeve 34 has a one element of a zipper attachment 34A at its top end, which is removably attached to a mating zipper element 34B at the bottom end of an air permeable bag B1. The air permeable bag B1 has an inlet connected to the exhaust tube of the conventional leaf and lawn blower/vacuum or mulching device.

It should be understood that the air permeable bag B1 may be a short conventional air permeable collection bag of the type formed of canvas or other air permeable material having a zipper at its bottom end, or may be a specially made short collection bag having a zipper at its bottom end.

The open bottom end 33 of the housing 31 is surrounded by a flange 35, and a rigid bag attachment ring 36 is slidably mounted on the exterior of the housing above the flange and is movable between a raised position and a lowered clamping position surrounding the flange in a snug, or frictionally engaged relation. The open top end of a conventional disposable plastic trash can liner or trash bag B is received over the flange 35 and releasably attached to the bottom end of the housing by lowering the bag attachment ring 36 to capture the top portion of the bag between the flange and the ring.

It should be understood that, alternatively, the conventional disposable plastic trash bag B may be releasably attached to the lower end of the housing 31, by an elastic band or other suitable clamping means.

Figure 10:
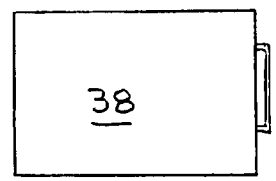
FIG. 10 is a top plan view of the slide-in retaining plate for the second embodiment.

As with the previous embodiment, a flat snap-on retaining cover attachment 37, as shown in FIG. 9, may be provided for snap fitting onto the flange 35 at the bottom end of the bagger housing 31 to cover its open bottom end 33 as shown in FIG. 8. A flat slide-in retaining plate 38, as shown in FIG. 10, may also be provided, which slides laterally into an opening or slot 39 in the side wall of the housing 31 (FIG. 8) above its open bottom end 33 to close the open bottom end.

Operation

The first embodiment of the leaf and lawn vacuum bagger 10 allows the use of the conventional leaf and lawn blower/vacuum or mulcher V in a manner similar to such devices that are not equipped with a collection bag, by enclosing the bottom of the housing 11 either with the snap-on retaining cover 23 or the slide-in retaining plate 24. This allows the vacuumed leaf and yard debris to be captured and retained in the housing 11 for later removal.

In operation, when a disposable bag B is attached to the lower end of the housing 11, vacuumed yard debris exhausted or discharged from the lawn blower/vacuum or mulcher device V travels through the hose 18 and into the interior of the housing 11, and the exhaust air exits through the exhaust screen 17, and to the exterior through the optional exhaust deflector 22 (if attached) and the yard debris falls down through the open bottom end 13 into the attached disposable bag B. The attached disposable bag B is then easily removed and replaced when full.

When the snap-on retaining cover 23 is attached, the yard debris is retained in the housing 11, which allows the user to quickly empty the yard debris into a receptacle when appropriate. When using the retaining cover attachment 23, it is not necessary to attach a bag to the housing.

When the slide-in retaining plate 24 is installed into the opening 25 of the housing 11, the plate closes the open bottom end 13 of the housing, and the yard debris is retained in the housing, as when the retaining cover 23 is attached. However, when using the slide-in retaining plate attachment 24, the collected yard debris can be disposed of in a dust-free manner. This is accomplished by attaching a conventional disposable plastic trash bag B onto to the lower end of the housing 11, as described above, and then removing the slide-in retaining plate 24 to allow the collected yard debris to fall through the open bottom end 13 into the attached disposable bag B, or other suitable receptacle if a bag is not attached.

Thus, the present leaf and lawn vacuum bagger 10 allows the user to bag yard debris from leaf and lawn blower/vacuums and mulchers, securely close or seal the full disposable or detachable bag B, and to detach and/or dispose of the full, closed or sealed disposable bag without exposure to airborne dust and debris normally associated with disposal of yard debris.

In the second embodiment, when a disposable bag B is attached to the lower end of the housing 31, the exhaust air from the lawn blower/vacuum or mulcher device V exits through the pores of the air permeable bag B2 to the atmosphere, and the discharged yard debris travels through the interior of the short air permeable bag B1, through the zippered sleeve 34, through the interior of the housing 31, and through its open bottom end 33 into the attached disposable bag B. The attached disposable bag B is then easily removed and replaced when full.

As with the first embodiment, when the snap-on retaining cover 37 or the slide-in retaining plate 38 is attached, the yard debris is retained in the housing 31, and when using the slide-in retaining plate attachment 38, a conventional disposable plastic trash bag B can be secured onto to the lower end of the housing 11, and then the slide-in retaining plate can be removed to allow the collected yard debris to fall into the disposable bag B, or other suitable receptacle if a bag is not attached.

While this invention has been described fully and completely with special emphasis upon a preferred embodiment, it should be understood that within the scope of the appended claims the invention may be practiced otherwise than as specifically described herein.

The invention claimed is:

1. A collection and bagging apparatus for a lawn blower/vacuum or mulcher for collecting leaves and lawn debris where the blower/vacuum or mulcher includes a nozzle through which leaves are suctioned into the blower/vacuum and an exhaust outlet through which the leaves are expelled, the collection and bagging apparatus comprising:

a generally hollow housing having a side wall defining an interior with an open bottom end, an inlet in said side wall adapted for connection in fluid communication with the exhaust outlet of the blower/vacuum or mulcher, an exhaust opening in said side wall covered by an exhaust screen, and a lower end of said housing configured to receive an open end of a disposable bag for collecting the leaves and lawn debris therein;

attachment means for releasably securing the open end of the disposable bag to said housing lower end in a substantially air sealing relation; and closure means at a lower end of said housing movable to selectively close or open said open bottom end; wherein when said open bottom end is closed leaves and yard debris exhausted through the blower/vacuum or mulcher travels into said housing interior, exhaust gases exit through said exhaust screen to the exterior, and the leaves and yard debris are collected in said housing interior, and when said housing open end is open, the collected leaves and yard debris falls through said housing open bottom end into the attached disposable bag, and the attached disposable bag is then removed and replaced as needed.

2. The collection and bagging apparatus according to claim 1, further comprising:

a hose connected at one end with said inlet in fluid communication with said housing interior and having an opposite end adapted for connection to the exhaust outlet of the blower/vacuum or mulcher.

3. The collection and bagging apparatus according to claim 1, wherein said closure means comprises a cover member removably connected over said housing open bottom end.

4. The collection and bagging apparatus according to claim 1, wherein said housing side wall has an aperture above said open bottom end; and said closure means comprises a generally flat retaining plate received in said housing interior through said slot in a position to selectively close or open said open bottom end.

5. The collection and bagging apparatus according to claim 1, further comprising:

an exhaust deflector attached over said exhaust screen and positionable to direct the exhaust passing therethrough away from said housing in selected directions.

* * * * *